(12) United States Patent
Thiessen

(10) Patent No.: US 12,721,280 B2
(45) Date of Patent: Sep. 1, 2026

(54) GRAIN BIN AERATION APPARATUS AND METHOD

(71) Applicant: 2376016 ALBERTA INC., Calgary (CA)

(72) Inventor: Lester Thiessen, Neilburg (CA)

(73) Assignee: 2376016 Alberta Inc., Neilburg (CA)

( * ) Notice: Subject to any disclaimer, the term of this patent is extended or adjusted under 35 U.S.C. 154(b) by 511 days.

(21) Appl. No.: 18/342,203

(22) Filed: Jun. 27, 2023

(65) Prior Publication Data

US 2024/0000023 A1 Jan. 4, 2024

Related U.S. Application Data

(60) Provisional application No. 63/357,128, filed on Jun. 30, 2022.

(51) Int. Cl.
*A01F 25/22* (2006.01)

(52) U.S. Cl.
CPC .................................. *A01F 25/22* (2013.01)

(58) Field of Classification Search
CPC .......... A01F 25/22; A01F 25/16; A01F 25/14; F26B 3/06; F26B 9/063; F26B 2200/06; B65D 88/74
See application file for complete search history.

(56) References Cited

U.S. PATENT DOCUMENTS

2020/0031571 A1 * 1/2020 Rosumowitsch ...... B65D 88/72

FOREIGN PATENT DOCUMENTS

CN 107896653 A * 4/2018 ............ A01F 25/14
CN 107950210 A * 4/2018 ............ A01M 1/00
CN 109105008 A * 1/2019 ............ A01F 25/22

OTHER PUBLICATIONS

English translation of CN-107896653-A, dated Dec. 9, 2025 (Year: 2025).*
English translation of CN-107950210-A, dated Dec. 9, 2025 (Year: 2025).*
English translation of CN-109105008-A, dated Dec. 9, 2025 (Year: 2025).*

* cited by examiner

*Primary Examiner* — Michael G Hoang
*Assistant Examiner* — Brett P. Mallon
(74) *Attorney, Agent, or Firm* — Ryan W. Dupuis; Kyle R. Satterthwaite; Ade & Company Inc.

(57) ABSTRACT

An aeration apparatus for a grain storage bin with a hopper bottom in which the apparatus includes (i) a primary duct extending diametrically across the bin in proximity to a top of the hopper bottom, (ii) two first secondary ducts in communication with the primary duct and extending circumferentially of the bin in two opposing directions from the first end of the primary duct towards respective discharge openings, and (iii) two second secondary ducts in communication with the primary duct and extending circumferentially of the bin in two opposing directions from the second end of the primary duct towards respective discharge openings. An inlet duct communicates the bin wall between an external aeration fan and the first end of the primary duct within the bin such that the fan is directed horizontally and coaxially with the primary duct.

18 Claims, 3 Drawing Sheets

4
4
32
36
42
34
54
52
44
44
44
44
24
26
54
28
30
5
5
56
56
58
40
34
22
32
20
22
22
22
22
14

16
42
34
48
52
26
34
50
50
56
44
44
44
44
44
22
20

GRAIN BIN AERATION APPARATUS AND METHOD

This application claims the benefit under 35 U.S.C.119(e) of U.S. provisional application Ser. No. 63/357,128, filed Jun. 30, 2022.

FIELD OF THE INVENTION

The present invention relates to an aeration apparatus arranged to be supported within a grain bin and method of aeration using the apparatus, and more particularly the present invention relates to a grain bin aeration system and method that is supported within the interior of a hopper bottom of the grain bin.

BACKGROUND

Agricultural products such as grains and the like are commonly stored in grain bins. A common type of grain bin includes a containment structure supported spaced above the ground on perimeter legs, which a conical wall defining a hopper bottom of the bin that tapers downwardly and inwardly to a central bottom discharge gate. To prevent spoilage of the grain during storage, or to optimize the moisture content of the grain before selling the grain, it is common to aerate the grain within the bin. This is typically accomplished by providing an aeration fan externally of the bin which directs a flow of air into ducting within the bin that distributes the air to various discharge locations within the bin.

US Patent Application Publication No. 2019/0329971 by Siemens discloses an example of an aeration system for a grain bin in which an aeration fan directs air into the bin through a single inlet port into a perimeter manifold supported within the grain bin to extend about a full perimeter of the grain bin. Discharge openings are provided at spaced positions about the circumference of the perimeter manifold. Due to the fan communicating with the perimeter manifold at one side of the bin, the resulting reduction in pressure at the opposing side of the bin can result in uneven aeration within the bin, resulting in inconsistent quality of the resulting stored grain.

SUMMARY OF THE INVENTION

According to one aspect of the present invention there is provided a method of aerating a grain storage bin having an upright perimeter wall and a hopper bottom defined by a conical wall tapering downwardly and inwardly from the upright perimeter wall to a discharge opening at a bottom of the conical wall, the method comprising:

providing an aeration apparatus comprising: (i) a primary duct spanning diametrically across the bin in proximity to a top of the hopper bottom from a first end to a second end of the primary duct; (ii) two first secondary ducts extending circumferentially of the bin in two opposing directions from the first end of the primary duct towards respective discharge openings of the first secondary ducts in which the first secondary ducts are in open communication with the first end of the primary duct; and (iii), two second secondary ducts arranged to be supported in the bin to extend circumferentially of the bin in two opposing directions from the second end of the primary duct towards respective discharge openings of the second secondary ducts in which the second secondary ducts are in open communication with the second end of primary duct;

connecting an aeration fan externally of the bin with the first end of the primary duct within the bin;

operating the aeration fan such that:

(i) the primary duct receives a primary flow of air from the aeration fan directed across the primary duct from the first end to the second end of the primary duct; and (ii) each secondary duct receives a secondary flow of air directed circumferentially away from the primary duct towards the discharge opening of the secondary duct for discharging the secondary flows of air into the bin through the discharge openings.

The method may further include supporting the aeration fan such that an outlet of the fan is directed horizontally and coaxially with a longitudinal axis of the primary duct.

According to a second aspect of the invention there is provided an aeration apparatus for use with an aeration fan for aerating a grain storage bin having an upright perimeter wall and a hopper bottom defined by a conical wall tapering downwardly and inwardly from the upright perimeter wall to a discharge opening at a bottom of the conical wall, the apparatus comprising:

a primary duct extending longitudinally between opposing first and second ends of the primary duct and being arranged to be supported spanning diametrically across the bin in proximity to a top of the hopper bottom;

two first secondary ducts arranged to be supported in the bin to extend circumferentially of the bin in two opposing directions from the first end of the primary duct towards respective discharge openings of the first secondary ducts, the first secondary ducts being in open communication with the first end of the primary duct;

two second secondary ducts arranged to be supported in the bin to extend circumferentially of the bin in two opposing directions from the second end of the primary duct towards respective discharge openings of the second secondary ducts, the second secondary ducts being in open communication with the second end of primary duct; and an inlet duct arranged to communicate through one of the walls of the bin between the aeration fan externally of the bin and the first end of the primary duct within the bin;

whereby (i) the primary duct receives a primary flow of air from the aeration fan directed across the primary duct from the first end to the second end of the primary duct, and (ii) each secondary duct receives a secondary flow of air directed circumferentially away from the primary duct towards the discharge opening of the secondary duct for discharging the secondary flows of air into the bin through the discharge openings.

The configuration of the aeration apparatus as described above allows air to be introduced from a fan into the grain bin through a single port while allowing the air to be directed across the diameter of the cone through a primary duct followed by circumferential flows from opposing ends of the primary duct around the top edge of the cone. This allows airflow to be directed into the interior of the bin both through the centre and about the full perimeter of the bin to maximize the even distribution of aeration air introduced into the bin from a single point of entry into the bin.

Preferably the primary duct includes at least one bottom opening at a bottom side of the primary duct so as to be to discharge a portion of the primary flow of air therethrough into the bin. The bottom opening is preferably spaced inwardly away from the first and second ends of the primary duct. Preferably a majority of the bottom side of the primary duct is closed by a bottom wall.

The discharge opening of each secondary duct may be situated at an inner boundary of the secondary duct arranged to be situated nearest to a center of the bin.

The discharge opening of each secondary duct preferably spans a length of the secondary duct in a direction circumferentially of the bin. A plurality of legs may be supported on each secondary duct and arranged to support a top wall of each secondary duct spaced above the conical wall of the hopper bottom at spaced apart positions circumferentially of the bin.

Each secondary duct may include a top wall arranged to be supported within the bin to be sloped downwardly and inwardly towards a center of the bin, in which the top wall is continuous and devoid of any openings.

Each of the secondary ducts is preferably arranged to extend circumferential though an arc of at least 45 degrees.

The secondary ducts may be arranged to collectively extend circumferentially about a full circumference of the bin. Preferably each first secondary duct is in open communication with a corresponding one of the second secondary ducts.

A continuous duct wall may be further provided to extend circumferentially about a full circumference of the bin, in which the continuous duct wall defines an upper boundary of each of the secondary ducts.

The apparatus may be further arranged such that: (i) the continuous duct wall is arranged to be supported within the bin to be sloped downwardly and inwardly towards a center of the bin, (ii) the primary duct has a top wall which is tapered upwardly and inwardly towards a central apex of the primary duct that spans a length of the primary duct between the first and second ends of the primary duct, and (iii) the top wall of the primary duct joins the continuous duct wall at each end of the primary duct at a respective seam which is sloped downwardly in two directions from the central apex of the primary duct.

When the apparatus is used in combination with the aeration fan, the aeration fan is preferably coupled to the inlet duct such that an outlet of the aeration fan is directed horizontally into the bin. Preferably the outlet of the aeration fan is coaxially aligned with a longitudinal axis of the primary duct.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figures 1, 2:
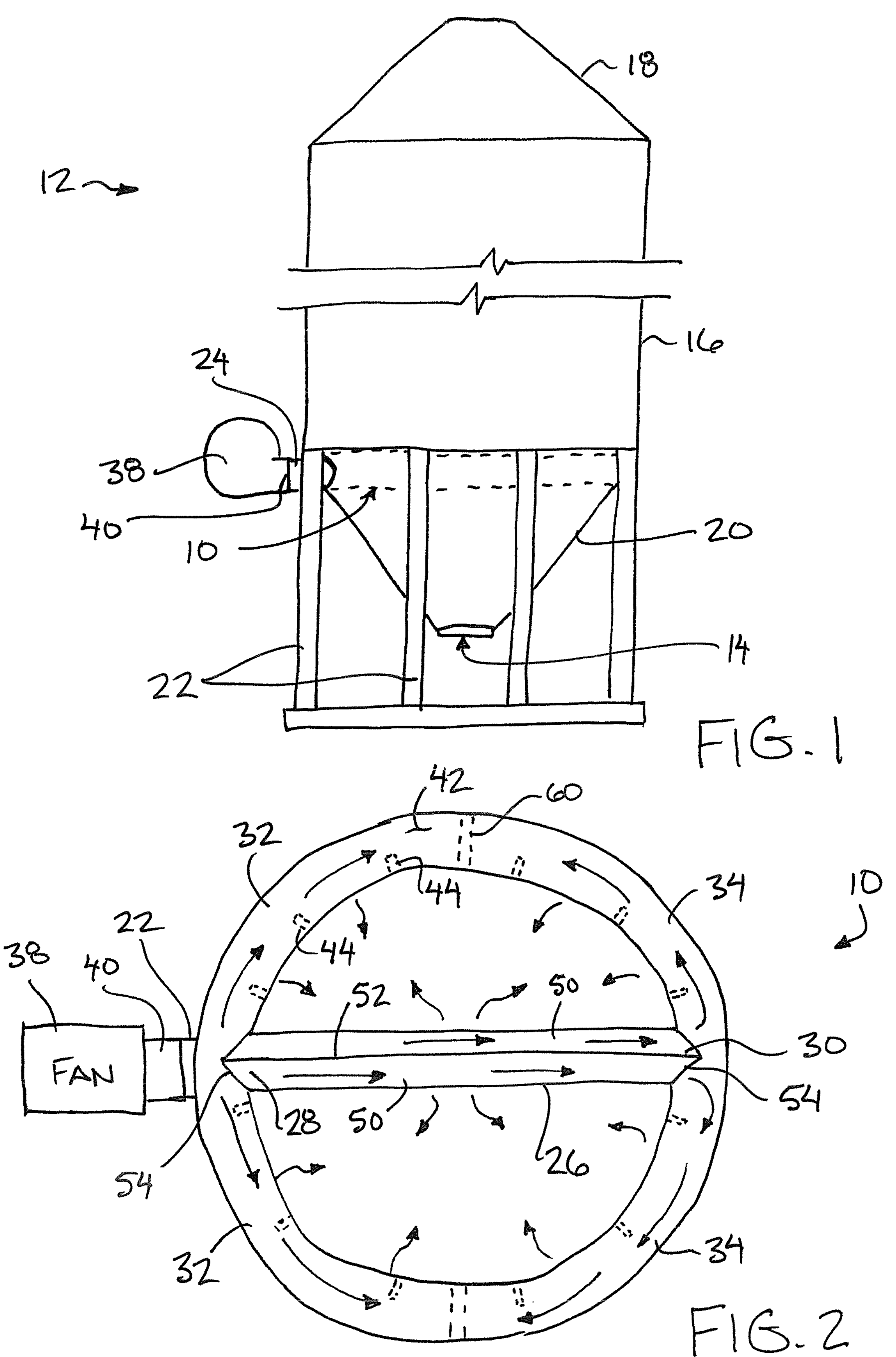
FIG. 1 is a side elevational view of one example of a grain bin upon which the aeration apparatus according to the present invention has been installed.
FIG. 2 is a top plan view of the aeration apparatus installed on the hopper bottom of the grain bin.
Figures 3, 4:
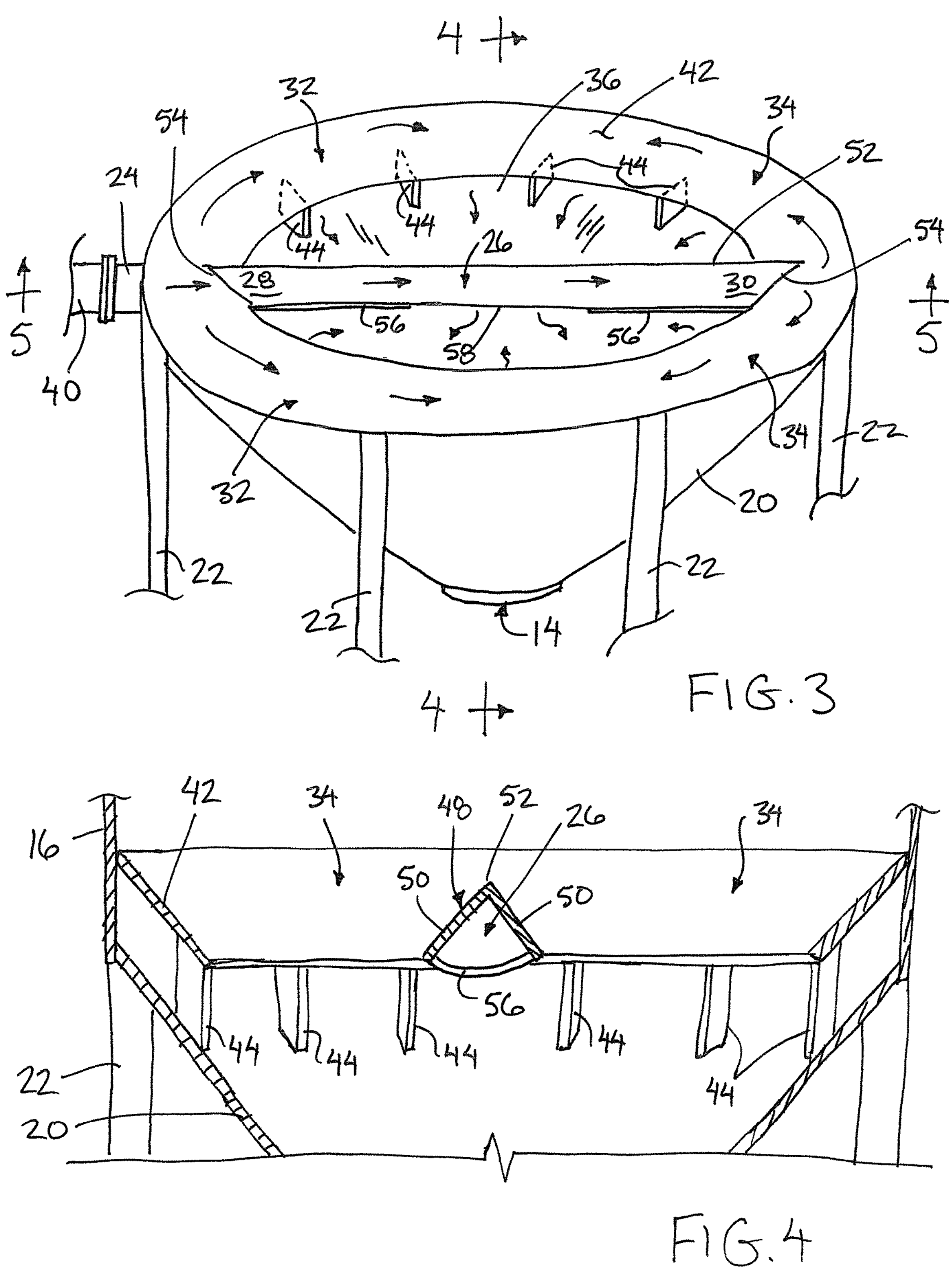
FIG. 3 is a perspective view of the hopper bottom of the grain bin with the cylindrical perimeter wall of the bin removed to illustrate the configuration of the aeration apparatus installed within the hopper bottom.
FIG. 4 is a sectional view of the aeration apparatus along the line 4-4 in FIG. 3.
Figure 5:
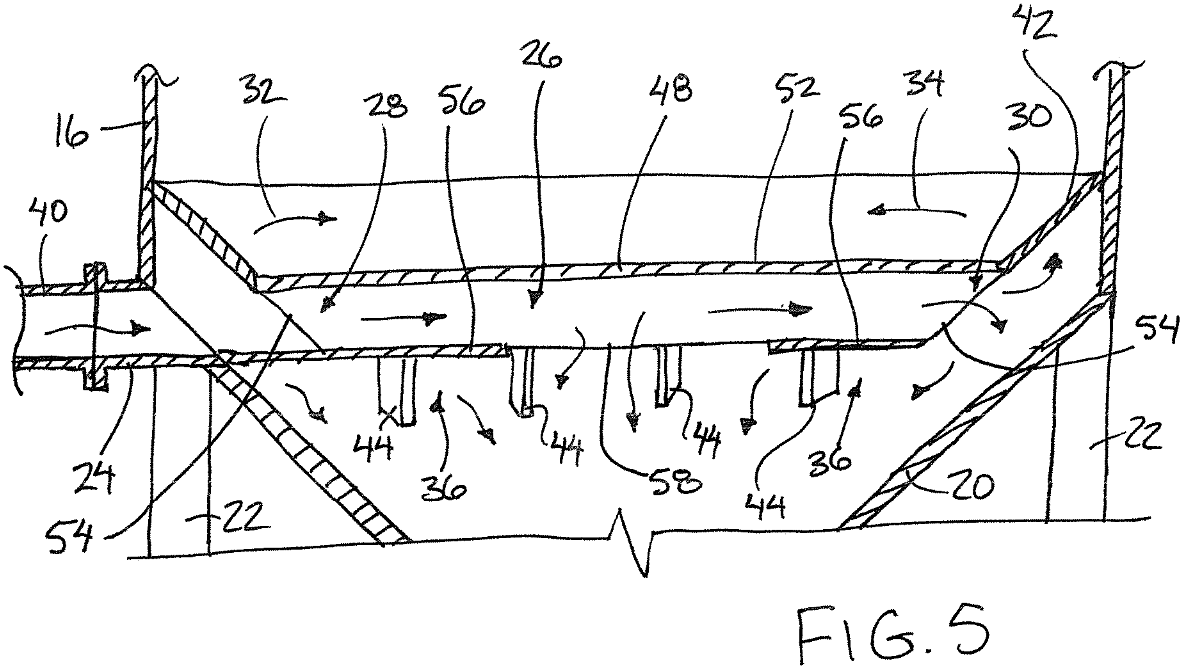
FIG. 5 is a sectional view of the aeration apparatus along the line 5-5 in FIG. 3.

Referring to the accompanying figures there is illustrated a grain bin aeration apparatus generally indicated by reference numeral 10. The apparatus 10 is particularly suited for use with a grain bin 12 of the type having a hopper bottom that discharges stored grain from an interior of the bin through a central discharge opening 14 at the bottom of the bin.

According to the illustrated embodiment, the grain bin 12 includes an upright, cylindrical perimeter wall 16 forming a perimeter boundary of the bin about a majority of the height of the bin. A lid 18 is provided in the form of a cone shaped rigid member that tapers upwardly and inwardly to a central apex for fully spanning and enclosing a top end of the upright perimeter wall 16. A conical wall 20 spans the bottom of the perimeter wall 16 and tapers downwardly and inwardly to the central discharge opening 14 to define the hopper bottom of the bin. The conical wall 20 thus fully encloses the bottom of the bin and is joined about the top edge thereof to the bottom of the perimeter wall 16. A plurality of legs 22 are mounted to the top end of the conical wall and the bottom end of the perimeter wall 16 at circumferentially spaced positions about the perimeter of the bin to support the conical wall spaced above the ground or a suitable foundation to allow for a material transfer conveyor to be received between the discharge opening 14 and the ground for unloading of the bin.

The grain bin aeration apparatus 10 is generally comprised of (i) an inlet duct 24 that communicates through the conical wall 20 of the bin, (ii) a primary duct 26 extending across a diameter of the bin from a first end 28 of the primary duct in open communication with the inlet duct 24 to a second end 30 of the primary duct at a diametrically opposite side of the bin, and (iii) secondary ducts 32 and 34 in open communication with opposing ends of the primary duct respectively to extend circumferentially about the bin from the primary duct to respective discharge openings 36 of the secondary ducts that direct aeration air radially inwardly into the bin.

The inlet duct 24 is located adjacent one side of the bin at the top of the conical wall adjacent to the bottom end of the perimeter wall 16. The inlet duct 24 communicates horizontally through a suitable opening in the conical wall between an aeration fan 38 supported externally of the bin and the interior of the bin. The fan or blower 38 includes a fan outlet 40 which is supported in direct connection to the inlet duct 24 such that the outlet 40 of the fan is directed horizontally and is coaxially aligned with a longitudinal axis of the primary duct 26 that extends across the diameter of the bin 12. The orientation of the fan ensures that airflow from the fan is efficiently directed into the primary duct such that a substantial portion of the airflow is directed across the diameter to balance pressure and airflows at diametrically opposed sides of the bin. As shown in the figures, the primary duct extends linearly and diametrically across the bin between opposing first and second ends adjacent opposing sides of the grain storage bin so that the primary flow is directed linearly through the primary duct across the center of the bin.

The apparatus 10 further includes a top duct wall 42 which defines an upper or top boundary of each of the secondary ducts about the full circumference of the bin. More particularly the top duct wall 42 is generally annular in shape so as to extend about the full perimeter of the bin while being joined to the upright perimeter wall 16 of the bin forming an annular manifold space that is collectively defined by the secondary ducts 32 and 34. The top duct wall 42 is supported at a location spaced above the conical wall 20 by a distance defining the height of an annular manifold between the top duct wall 42 and the upper portion of the conical wall 20. The duct wall 42 is sloped downwardly and radially inwardly to be generally frustoconical in shape in parallel relation to the conical wall 20 below. The top duct wall 42 is continuous and devoid of openings about the full perimeter thereof.

A plurality of legs 44 are mounted at circumferentially spaced positions along the inner edge of the top duct wall 42 to extend downwardly from the top duct wall 42 to be connected to the conical wall 20 therebelow, whereby the top duct wall is supported in parallel relation spaced above the conical wall 20. Each leg 44 comprises a flat plate oriented in a radial direction of the bin and having an upright edge at the radially innermost end in alignment with an inner boundary of the annular manifold. The opposing outer edge of each leg in the radial direction remains spaced radially inward from the perimeter wall 16 of the bin so as not to interfere with flows in the circumferential direction about the full circumference of the bin.

The inner side of the annular manifold in the radial direction (corresponding to an inner boundary of each of the secondary ducts defined within the annular manifold) remains fully open between the legs 44 such that the inner boundary of each secondary duct comprises a discharge opening 36 extending substantially the full length of each secondary duct and collectively spanning the full circumference of the annular manifold. Furthermore, each discharge opening 36 of the secondary ducts spans a full height of the annular manifold at the radially inner side thereof between the top duct wall 42 above and the conical wall 20 of the hopper bottom below.

The primary duct 26 includes a top wall 48 formed by two plate members 50 which are joined to one another at a central apex 52 that extends horizontally across a full diameter of the bin. The two plate members 50 extend downwardly and laterally outwardly in opposing directions from the central apex 52 to the bottom boundary of the primary duct. The top wall 48 thus has an inverted V-shape with the resulting cross-sectional shape of the primary duct being generally triangular. The top wall 48 of the primary duct intersects the top duct wall 42 of the annular manifold at opposing ends of the primary duct. At the intersection of each end of the primary duct 26 with the annular manifold, the top wall 48 of the primary duct forms a seam having two portions extending downwardly and laterally outwardly from opposing sides of the central apex 52 of the primary duct.

Two opposing end portions of the primary duct are enclosed at the bottom side thereof by respective bottom wall members 56. Each bottom wall member 56 is a plate spanning horizontally between the bottom edges of the plate members 50 forming the top wall along the respective end portion of the primary duct. The bottom wall member 56 at each end portion of the primary duct encloses the bottom side of the primary duct from the respective end of the primary duct that is abutted with the conical wall 20 towards an inner end of the bottom wall member situated partway toward the center of the bin. A remaining central portion of the primary duct adjacent a center of the bin remains open at the bottom side between the two bottom wall members at opposing ends to define a discharge opening 58 of the primary duct at a central location of the bin. The overall area covered by the bottom wall members 56 collectively is greater than the corresponding area occupied by the discharge opening 58 to ensure a majority of the primary airflow directed into the primary duct by the fan is directed diametrically across the bin from the first into the second end of the primary duct and only a smaller portion of the overall airflow through the primary duct is discharged through the discharge opening 58 at the bottom of the primary duct into the interior of the bin at a central location relative to the cylindrical wall 16.

The open communication of both ends of the primary duct with the annular manifold and the arrangement of the annular manifold to extend about the full circumference of the bin results in four distinct circumferentially oriented secondary airflows within four secondary duct portions 32 and 34 respectively. The secondary ducts include two first ducts 32 extending circumferentially within the annular manifold in opposing directions from the first end 28 of the primary duct and two second ducts 34 extending circumferentially within the annular manifold in opposing directions from the second end 30 of the primary duct. The open inner side of each of the secondary ducts 32 and 34 defines discharge openings 36 spanning the full length in the circumferential direction of each secondary duct 32 and 34.

In operation, the aeration fan 38 directs flow into the primary duct 26 to extend diametrically across the bin from the first end to the second end of the primary duct. A smaller portion of the flow directed into the primary duct is discharged directly into the bin through the central bottom discharge opening 58 of the primary duct. The pressurized air flow into the primary duct results in the majority of the airflow from the fan directed into the primary duct being discharged substantially evenly into the annular manifold from both opposing ends of the primary duct. This results in four secondary airflows extending in two opposing circumferential directions from each end of the primary duct within the four secondary ducts 32 and 34 described above. The circumferential secondary airflows within the secondary duct 32 and 34 are discharged substantially evenly in a radially inward direction into the interior of the bin through the discharge openings 36 of the secondary ducts 32 and 34.

In further embodiments, the four secondary ducts 32 and 34 are not required to be in open communication with one another about the full circumference of the bin according to the annular manifold shown in the illustrated embodiment. For example, in the previous embodiment where each first secondary duct 32 openly communicates with a corresponding one of the second secondary ducts 34, a divider plate may be provided for fully separating the first duct 32 from the second ducts 34 while still resulting in substantially identical primary and secondary airflows within the bin. A divider plate is represented schematically in broken line by reference character 60 in FIG. 2 for illustrative purposes only.

In yet further embodiments, in place of a continuous annular manifold as shown in the illustrated embodiment, two distinct secondary ducts 32 may extend circumferentially in opposing directions from the first end of the primary duct and two distinct secondary ducts 34 may extend circumferentially in opposing directions from the second end of the primary duct such that the terminal ends of the first secondary ducts 32 remain circumferentially spaced apart and separate from the terminal ends of the corresponding second secondary ducts 34. In this instance, each of the secondary duct preferably extends circumferentially through a range of at least 45 degrees to maintain a substantially even distribution of airflow radially inwardly from the secondary ducts about the full perimeter of the bin.

The primary duct 26 in any of the above embodiments, may instead be a tubular duct with a circular cross section. The top wall portion of the primary duct 26 preferably remains devoid of openings and tapers upwardly to a central apex to prevent collection of grain thereon when discharging the bin.

The discharge opening of the primary duct 26 in any of the above embodiments may take the form of one or more openings along a bottom portion of the primary duct, or the bottom portion of the duct may be perforated to allow some discharge of air into the center of the bin directly from the primary duct while a majority of the flow through the primary duct remains directed across the bin to the opposing side of the annular manifold forming the secondary ducts.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. An aeration apparatus for use with an aeration fan for aerating a grain storage bin having an upright perimeter wall and a hopper bottom defined by a conical wall tapering downwardly and inwardly from the upright perimeter wall to a discharge opening at a bottom of the conical wall, the apparatus comprising:

a primary duct extending linearly between opposing first and second ends of the primary duct and being arranged to be supported in proximity to a top of the hopper bottom spanning linearly and diametrically across the bin between the first and second ends of the duct at opposing sides of the grain storage bin;

two first secondary ducts arranged to be supported in the bin to extend circumferentially of the bin in two opposing directions from the first end of the primary duct towards respective discharge openings of the first secondary ducts, the first secondary ducts being in open communication with the first end of the primary duct;

two second secondary ducts arranged to be supported in the bin to extend circumferentially of the bin in two opposing directions from the second end of the primary duct towards respective discharge openings of the second secondary ducts, the second secondary ducts being in open communication with the second end of primary duct; and an inlet duct arranged to communicate through one of the walls of the bin between the aeration fan externally of the bin and the first end of the primary duct within the bin;

wherein the primary duct is arranged to receive a primary flow of air from the aeration fan directed linearly across a center of the grain storage bin from the first end to the second end of the primary duct;

wherein each secondary duct is arranged to receive a secondary flow of air directed circumferentially away from the primary duct towards the discharge opening of the secondary duct for discharging the secondary flows of air into the bin through the discharge openings.

2. The apparatus according to claim 1 wherein the primary duct includes at least one bottom opening at a bottom side of the primary duct adjacent the center of the grain storage bin so as to be arranged to discharge a portion of the primary flow of air therethrough into the grain storage bin.

3. The apparatus according to claim 2 wherein the at least one bottom opening is spaced inwardly away from the first and second ends of the primary duct.

4. The apparatus according to claim 2 wherein a majority of the bottom side of the primary duct is closed by a bottom wall.

5. The apparatus according to claim 1 wherein the discharge opening of each secondary duct is situated at an inner boundary of the secondary duct arranged to be situated nearest to a center of the bin.

6. The apparatus according to claim 1 wherein the discharge opening of each secondary duct spans a length of the secondary duct in a direction circumferentially of the bin.

7. The apparatus according to claim 6 further comprising a plurality of legs supported on each secondary duct and arranged to support a top wall of each secondary duct spaced above the conical wall of the hopper bottom at spaced apart positions circumferentially of the bin.

8. The apparatus according to claim 1 wherein each secondary duct includes a top wall arranged to be supported within the bin to be sloped downwardly and inwardly towards a center of the bin, the top wall being continuous and devoid of any openings.

9. The apparatus according to claim 1 wherein each of the secondary ducts is arranged to extend circumferential though an arc of at least 45 degrees.

10. The apparatus according to claim 1 wherein the secondary ducts are arranged to collectively extend circumferentially about a full circumference of the bin.

11. The apparatus according to claim 10 wherein each first secondary duct is in open communication with a corresponding one of the second secondary ducts.

12. The apparatus according to claim 1 further comprising a continuous duct wall arranged to extend circumferentially about a full circumference of the bin, the continuous duct wall defining an upper boundary of each of the secondary ducts.

13. The apparatus according to claim 12 further comprising:

the continuous duct wall being arranged to be supported within the bin to be sloped downwardly and inwardly towards a center of the bin;

the primary duct having a top wall which is tapered upwardly and inwardly towards a central apex of the primary duct that spans a length of the primary duct between the first and second ends of the primary duct; and the top wall of the primary duct joining the continuous duct wall at each end of the primary duct at a respective seam which is sloped downwardly in two directions from the central apex of the primary duct.

14. The apparatus according to claim 1 in combination with the aeration fan, the aeration fan being coupled to the inlet duct such that an outlet of the aeration fan is directed horizontally into the bin.

15. The apparatus according to claim 14 wherein the outlet of the aeration fan is coaxially aligned with a longitudinal axis of the primary duct.

16. A method of aerating a grain storage bin having an upright perimeter wall and a hopper bottom defined by a conical wall tapering downwardly and inwardly from the upright perimeter wall to a discharge opening at a bottom of the conical wall, the method comprising:

providing an aeration apparatus comprising: (i) a primary duct spanning linearly and diametrically across the bin in proximity to a top of the hopper bottom from a first end to a second end of the primary duct; (ii) two first secondary ducts extending circumferentially of the bin in two opposing directions from the first end of the primary duct towards respective discharge openings of the first secondary ducts in which the first secondary ducts are in open communication with the first end of the primary duct; and (iii), two second secondary ducts arranged to be supported in the bin to extend circumferentially of the bin in two opposing directions from the second end of the primary duct towards respective discharge openings of the second secondary ducts in which the second secondary ducts are in open communication with the second end of primary duct;

connecting an aeration fan externally of the bin with the first end of the primary duct within the bin;

operating the aeration fan such that:

(i) the primary duct receives a primary flow of air from the aeration fan directed linearly and diametrically across the a center of the grain storage bin from the first end to the second end of the primary duct; and (ii) each secondary duct receives a secondary flow of air directed circumferentially away from the primary duct towards the discharge opening of the secondary duct for discharging the secondary flows of air into the bin through the discharge openings.

17. The method according to claim 16 further comprising supporting the aeration fan such that an outlet of the fan is directed horizontally and coaxially with a longitudinal axis of the primary duct.

18. An aeration apparatus for use with an aeration fan for aerating a grain storage bin having an upright perimeter wall and a hopper bottom defined by a conical wall tapering downwardly and inwardly from the upright perimeter wall to a discharge opening at a bottom of the conical wall, the apparatus comprising:

a primary duct extending longitudinally between opposing first and second ends of the primary duct and being arranged to be supported spanning diametrically across the bin in proximity to a top of the hopper bottom;

two first secondary ducts arranged to be supported in the bin to extend circumferentially of the bin in two opposing directions from the first end of the primary duct towards respective discharge openings of the first secondary ducts, the first secondary ducts being in open communication with the first end of the primary duct;

two second secondary ducts arranged to be supported in the bin to extend circumferentially of the bin in two opposing directions from the second end of the primary duct towards respective discharge openings of the second secondary ducts, the second secondary ducts being in open communication with the second end of primary duct; and an inlet duct arranged to communicate through one of the walls of the bin between the aeration fan externally of the bin and the first end of the primary duct within the bin;

wherein the primary duct is arranged to receive a primary flow of air from the aeration fan directed across the primary duct from the first end to the second end of the primary duct;

wherein each secondary duct is arranged to receive a secondary flow of air directed circumferentially away from the primary duct towards the discharge opening of the secondary duct for discharging the secondary flows of air into the bin through the discharge openings; and wherein the primary duct includes at least one bottom opening at a bottom side of the primary duct adjacent a center of the grain storage bin so as to be arranged to discharge a portion of the primary flow of air therethrough into the grain storage bin.

* * * * *